US012258785B2

(12) United States Patent
Li

(10) Patent No.: US 12,258,785 B2
(45) Date of Patent: Mar. 25, 2025

(54) CODE CHANGING STRUCTURE APPLIED TO KEY CODED LOCK

(71) Applicant: XIAMEN MAKE SECURITY TECHNOLOGY CO., LTD., Fujian (CN)

(72) Inventor: Yijian Li, Fujian (CN)

( * ) Notice: Subject to any disclaimer, the term of this patent is extended or adjusted under 35 U.S.C. 154(b) by 304 days.

(21) Appl. No.: 17/922,794

(22) PCT Filed: Sep. 24, 2020

(86) PCT No.: PCT/CN2020/117259
§ 371 (c)(1),
(2) Date: Nov. 2, 2022

(87) PCT Pub. No.: WO2022/061624
PCT Pub. Date: Mar. 31, 2022

(65) Prior Publication Data
US 2023/0212878 A1 Jul. 6, 2023

(51) Int. Cl.
*E05B 37/00* (2006.01)
*E05B 37/16* (2006.01)

(52) U.S. Cl.
CPC ...... *E05B 37/0034* (2013.01); *E05B 37/0048* (2013.01); *E05B 37/163* (2013.01)

(58) Field of Classification Search
CPC ............. E05B 37/0031; E05B 37/0041; E05B 37/0048; E05B 37/0058; E05B 37/0065; E05B 37/0075; E05B 37/0079; E05B 37/16; E05B 37/163
See application file for complete search history.

(56) References Cited

U.S. PATENT DOCUMENTS

| | | | | |
|---|---|---|---|---|
| 6,298,698 B1 * | 10/2001 | Nakajima | E05B 37/16 70/299 |
| 7,316,139 B2 * | 1/2008 | Nakazima | E05B 37/16 70/214 |
| 8,375,751 B2 * | 2/2013 | Hacker | E05B 37/16 70/299 |
| 8,555,686 B2 * | 10/2013 | Meekma | E05B 37/166 70/309 |
| 2005/0210937 A1 * | 9/2005 | Okuda | E05B 37/16 70/299 |
| 2015/0101371 A1 * | 4/2015 | Yi | E05B 37/16 70/382 |

FOREIGN PATENT DOCUMENTS

KR 101686769 B1 * 12/2016

* cited by examiner

*Primary Examiner* — Alyson M Merlino

(57) ABSTRACT

A code changing structure for a key coded lock, including a lock base, a push rod, locking pieces, a knob, a linkage assembly, a position resetting assembly, and corresponding key springs, password keys, button springs and buttons. A press-rotating mechanism operable below a code changing height is provided between the buttons and key slots. When a correct password is entered, the knob rotate to a first angle or a second angle. When the knob rotates to the first angle, the key coded lock is in an unlocked state, the lock pieces move away from the knob and prevent the buttons to reach the code changing height. When the knob rotates to the second angle, the lock pieces move towards the knob and allow the buttons to be pressed down to the code changing height so as to drive the password keys to rotate to change the password.

12 Claims, 9 Drawing Sheets

CODE CHANGING STRUCTURE APPLIED TO KEY CODED LOCK

BACKGROUND OF THE INVENTION

The present invention relates to the field of key coded locks, and more particularly a code changing structure applied to a key coded lock.

A key coded lock contains the characteristics of both electronic locks and mechanical key locks, which is convenient for users to unlock with a password without the need of carrying keys around, and provides strong stability by performing locking function with purely mechanical linkages to avoid the risks of malfunction caused by electronic failure, thus having good market prospects.

To reduce the security risks of password leaks when using a key coded lock, users are recommended to change the password regularly. However, a conventional key coded lock involves complicated operations when changing password, requiring the key coded lock to be disassembled to rearrange its inner structure. This is particularly difficult, time-costing and effort-consuming for ordinary users without specific skills to operate, leading to very poor user experience.

BRIEF SUMMARY OF THE INVENTION

The present invention provides a code changing structure applied to a key coded lock, which enables users to change password when the lock is under usage, providing a simple, time-saving and effort-saving operation process.

To attain the above object, the present invention provides the following technical solutions: A code changing structure, applied to a key coded lock; wherein the code changing structure comprises a lock base, a push rod, two locking pieces, a rotating knob, a linkage assembly, a position resetting assembly, and sets of corresponding key springs, password keys, button springs and buttons; a top surface of the lock base is provided with a sliding groove, an installing cavity and a plurality of password key slots; the sliding groove is connected to the mounting cavity along a lengthwise direction of the lock base; the password key slots are arranged symmetrically in pairs along two sides of the sliding groove; the push rod is slidably fitted with the sliding groove; two sides of the push rod are respectively provided with a plurality of hooks corresponding to the password key slots; the two locking pieces are respectively slidably arranged on the two sides of the sliding groove and positioned outside the password key slots; an inner side of each locking piece is provided with a plurality of openings corresponding to the password key slots; the rotating knob is rotatably fitted inside the installing cavity; the linkage assembly is assembled on the rotating knob, and drives the push rod and the locking pieces to move axially along with rotation of the rotating knob; the position resetting assembly is configured to drive the push rod, the locking pieces and the rotating knob to reset to an initial position; the key springs and the password keys are fitted inside the corresponding password key slots; upper positioning grooves, lower positioning grooves and an annular position-limiting groove are provided successively from top to bottom on a peripheral surface of each password key: the upper positioning grooves and the lower positioning grooves are arranged in a staggered manner by orienting differently by an angle of difference on a circumferential plane of each password key; when each password key is pressed, the annular position-limiting groove of each password key is hooked by a corresponding hook to stop the password key from bouncing up; when a correct password key is pressed, the upper positioning grooves thereof allow an axial movement of a corresponding locking piece; when an incorrect password key is not pressed, the lower positioning grooves thereof allow an axial movement of the locking piece; a corresponding button spring and a corresponding button are successively fitted on a top end of each password key; a press-rotating mechanism is provided between each button and each corresponding password key slot to drive a corresponding password key to rotate; a code-changing height is preset during a pressing process of the buttons; when each button is pressed to a position below the code-changing height, the press-rotating mechanism thereof is triggered to rotate a corresponding password key so as to change password; after entering the correct password, the rotating knob is rotatable; a first angle and a second angle of rotation are preset during a rotating process of the rotating knob; when the rotating knob rotates to the first angle, the key coded lock is in an unlocked state, wherein the locking pieces move away from the rotating knob and prevent the buttons from being pressed to the code-changing height when being pressed; when the rotating knob rotates to the second angle, the locking pieces move towards the rotating knob, so that the openings allow movements of the buttons, and the buttons are then able to be pressed to the code-changing height so as to change password.

Each press-rotating mechanism comprises guiding convex edges provided on a side wall of the corresponding password key slot, guiding grooves provided on a bottom end of the corresponding password key matching with the guiding convex edges, a plurality of first V-shaped blocks provided on a top portion of the corresponding password key, and a plurality of second V-shaped blocks provided inside the corresponding button; a junction part of every two adjacent first V-shaped blocks aligns with a corresponding guiding groove; the first V-shaped blocks and the second V-shaped blocks are arranged in a staggered manner around an axis of the corresponding password key; a first rotating inclined surface and a second rotating inclined surface are provided on a bottom end of each guiding convex edge and a side surface of each guiding groove respectively; when a button is pressed, the button drives the guiding grooves of a corresponding password key to be slidably fitted with the corresponding guiding convex edges so that the button moves downward, until the first rotating inclined surfaces and the second rotating inclined surfaces are at a same level; action force produced by staggered arrangement of the second V-shaped blocks and the first V-shaped blocks rotates the corresponding password key such that the first rotating inclined surfaces engage with the corresponding second rotating inclined surfaces; when the password key resets, the second rotating inclined surfaces move along the first rotating inclined surfaces to drive the password key to rotate, so as to change password.

The second rotating inclined surfaces of the guiding grooves drive the corresponding password key to rotate by ninety degrees so that password can be changed.

The upper positioning grooves and the lower positioning grooves of each password key are oriented by a ninety-degree difference with respect to each other on a circumferential plane of the password key.

The linkage assembly comprises an abutment piece cam fitted with the rotating knob, and an abutment piece around the abutment piece cam; an end of each locking piece abuts the abutment piece; a periphery of the abutment piece cam is provided with a first truncated surface, a pair of unlocking convex cambered surfaces and a pair of code-changing truncated surfaces successively arranged; during a process when the rotating knob is rotating to the first angle, either one of the unlocking convex cambered surfaces pushes the abutment piece to drive the locking pieces to move away from the rotating knob; during a process when the rotating knob is rotating to the second angle, either one of the code-changing truncated surfaces gives way to the abutment piece and thus enabling the locking pieces to move towards the rotating knob.

Two sides of the first truncated surface are symmetrically provided with said pair of unlocking convex cambered surfaces respectively and said pair of code-changing truncated surface respectively.

The first angle is set as ninety degrees, and the second angle is set as one hundred thirty-five degrees.

The linkage assembly further comprises a push rod cam fitted with the rotating knob; the push rod abuts a periphery of the push rod cam; the periphery of the push rod cam is successively provided with a second truncated surface and a pair of resetting convex cambered surfaces; during a process when the rotating knob is rotating to the first angle, either one of the resetting convex cambered surfaces pushes the push rod to move away from the rotating knob, so that each hook is separated from a corresponding annular position-limiting groove so as to reset password.

Two sides of the second truncated surface are symmetrically provided with said pair of convex cambered resetting surface respectively.

The linkage assembly further comprises a limiting device slidably fitted with the lock base, and a limiting ring fitted with the rotating knob; the limiting device abuts a periphery of the limiting ring; two position-limiting projections are provided on the periphery of the limiting ring; positions of the two position-limiting projections are arranged corresponding to the first angle and the second angle of the rotating knob respectively; when the limiting device is in a closed state, the limiting device and the one of the position-limiting projections coordinately limit the rotating motion of the limiting ring within the first angle; when the limiting device is in an opened state, the limiting device and another one of the position-limiting projections coordinately limit the rotating motion of the limiting ring within the second angle.

The position resetting assembly comprises a torsion spring provided between the installing cavity and the rotating knob, a push rod spring provided between an end of the sliding groove and the push rod, and two locking piece springs respectively provided between the lock base and each locking piece.

Each opening comprises a password key positioning groove and a button positioning groove adjacent to each other; a periphery of a bottom end of each button is provided with position-limiting convex edges; when the locking pieces are in an initial position, the password key positioning grooves enable the buttons to drive the password keys to be pressed, while the locking pieces block the position-limiting convex edges of the buttons to limit the buttons from being pressed to the code-changing height; when the locking pieces move towards the rotating knob, the button positioning grooves enable the buttons to drive the password keys to be pressed to the code-changing height.

Pressing heights of the buttons and the password keys are limited by different rotating angles of the rotating knob; when a correct password is entered and the rotating knob is rotated to the second angle, the buttons can be pressed to drive the password keys to lower to the code-changing height, so as to change password by triggering the press-rotating mechanism; code-changing operation of the present invention only requires entering a correct password without the needs to disassemble the lock, which is simple, time-saving and effort-saving to operate, thus providing good users experience.

Figure 1:
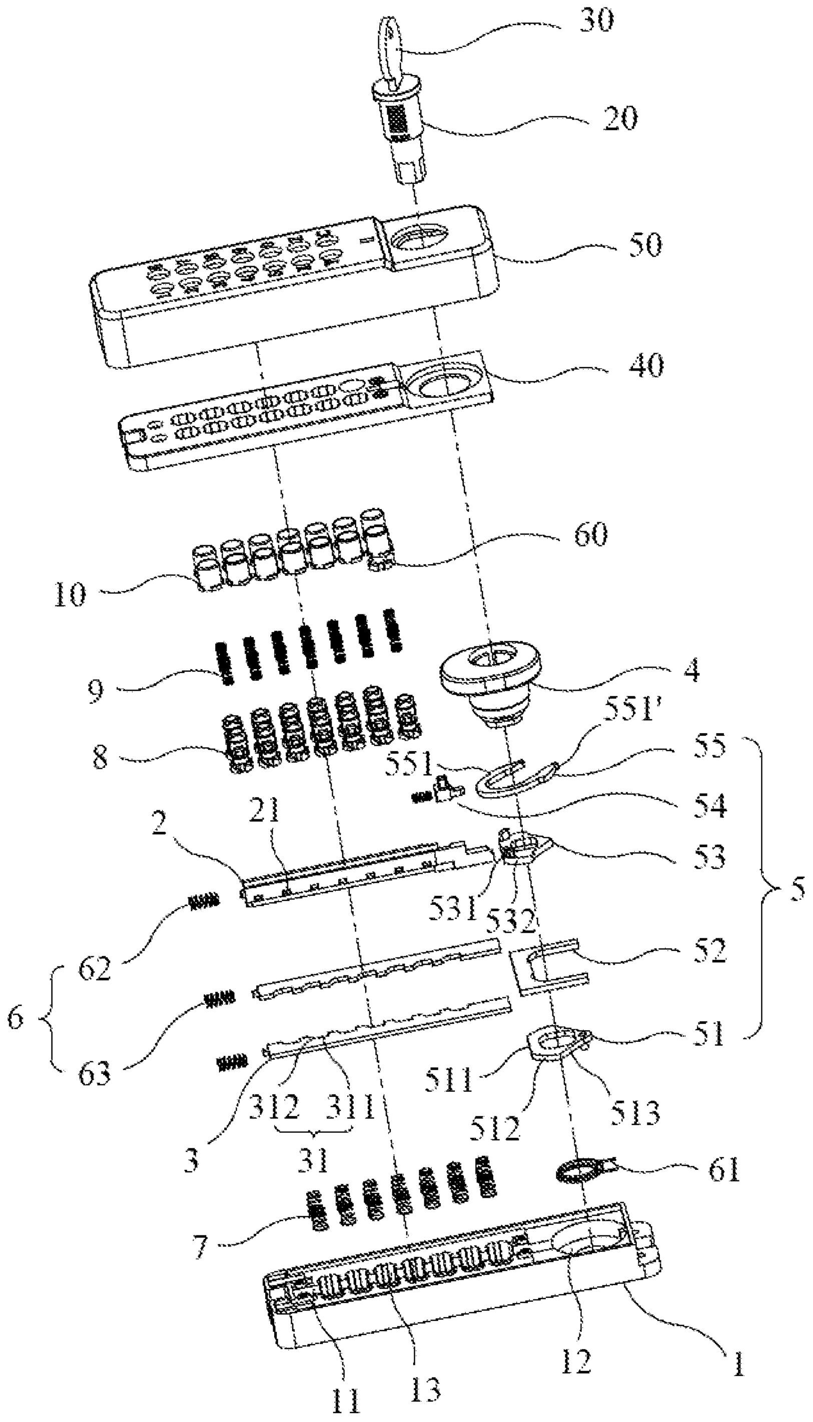
FIG. 1 shows an exploded view of an embodiment of the present invention.
Figure 2:
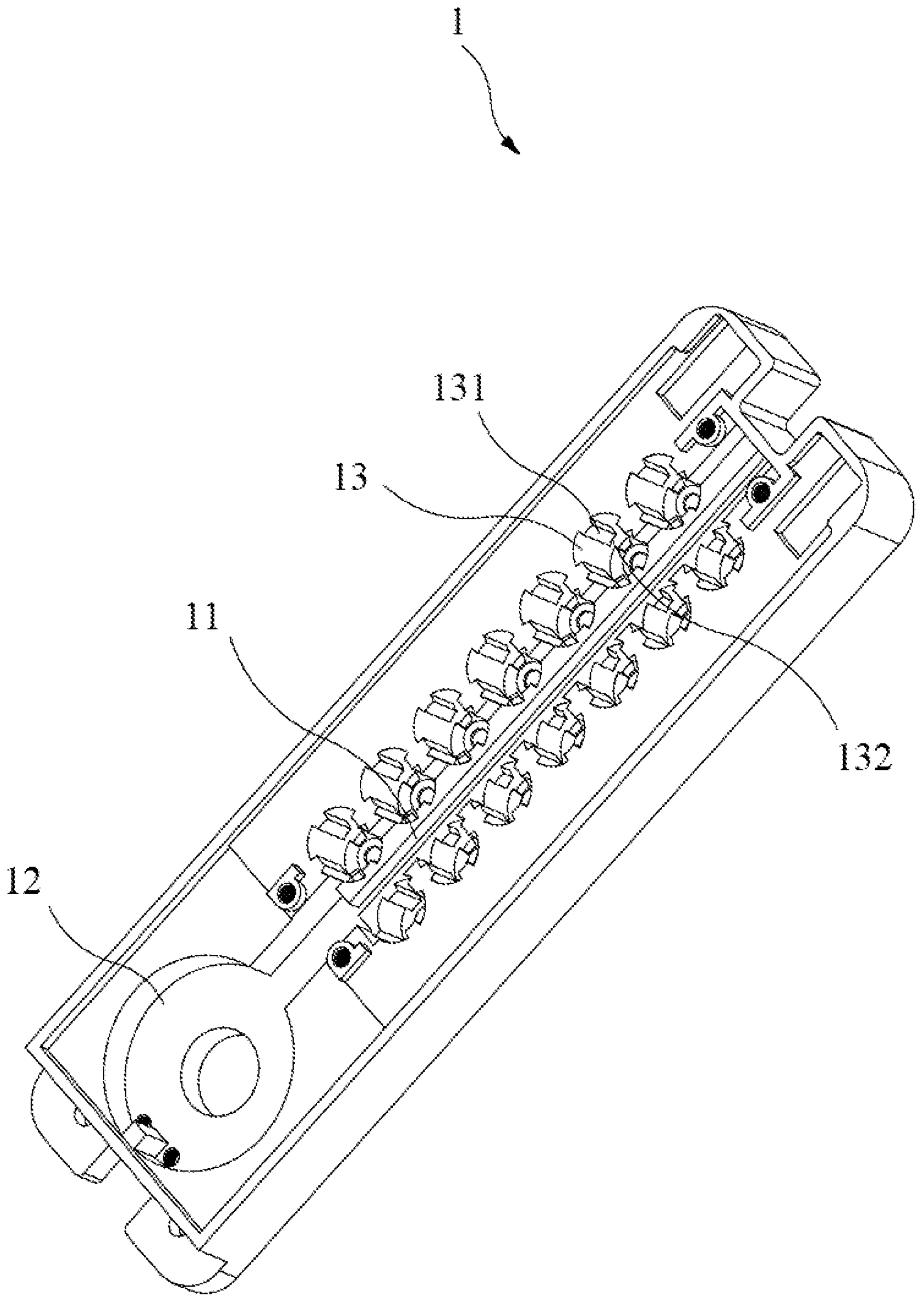
FIG. 2 shows a perspective view of the lock base of an embodiment of the present invention.
Figure 3:
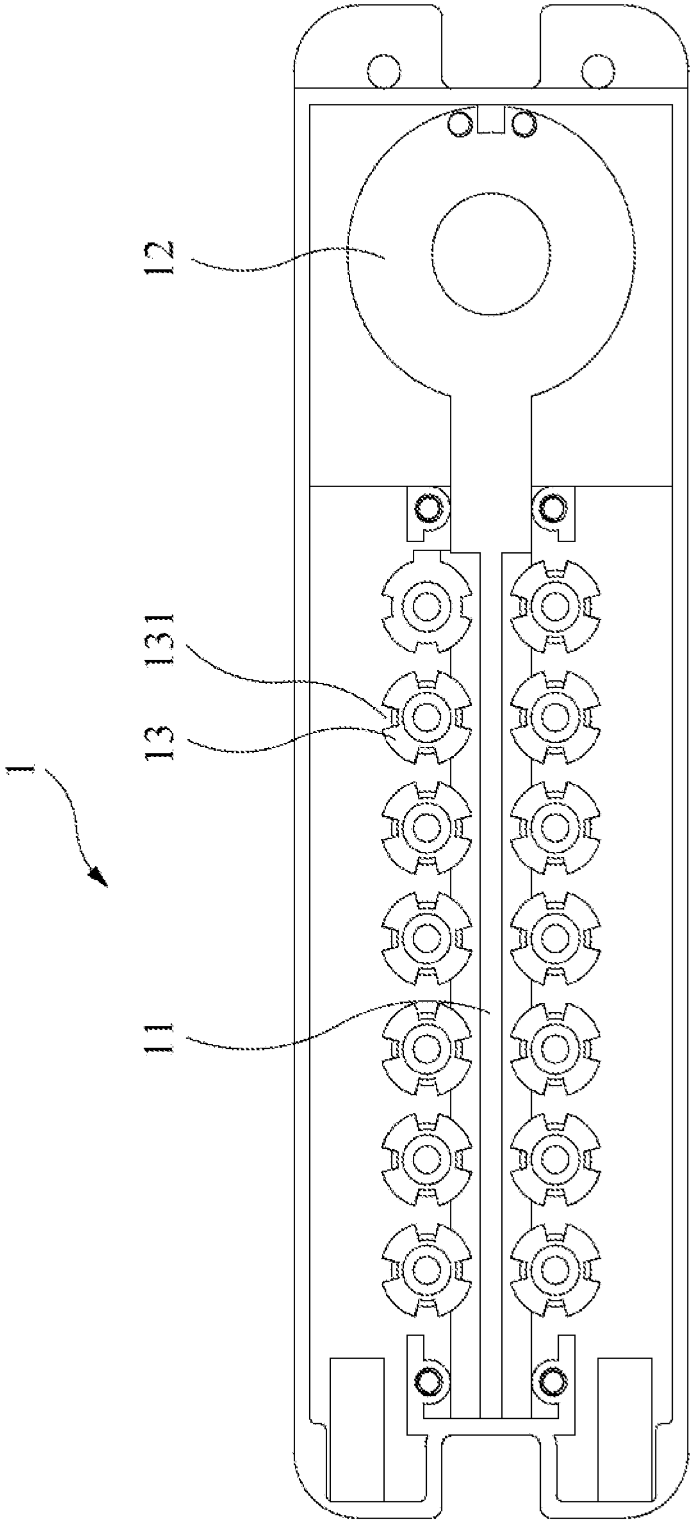
FIG. 3 shows a top view of the lock base of an embodiment of the present invention.
Figure 4:
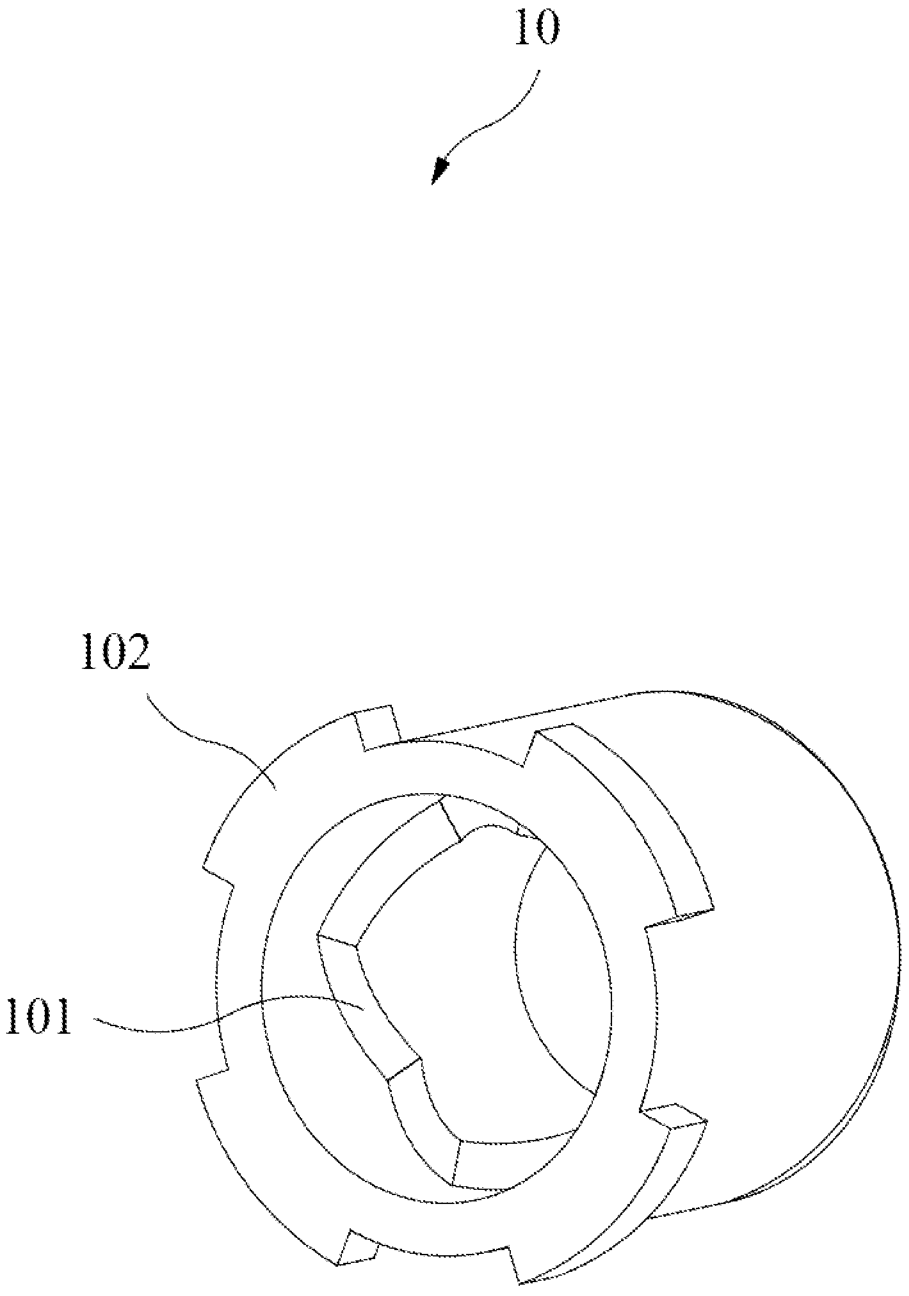
FIG. 4 shows a perspective view of a button of an embodiment of the present invention.
Figure 5:
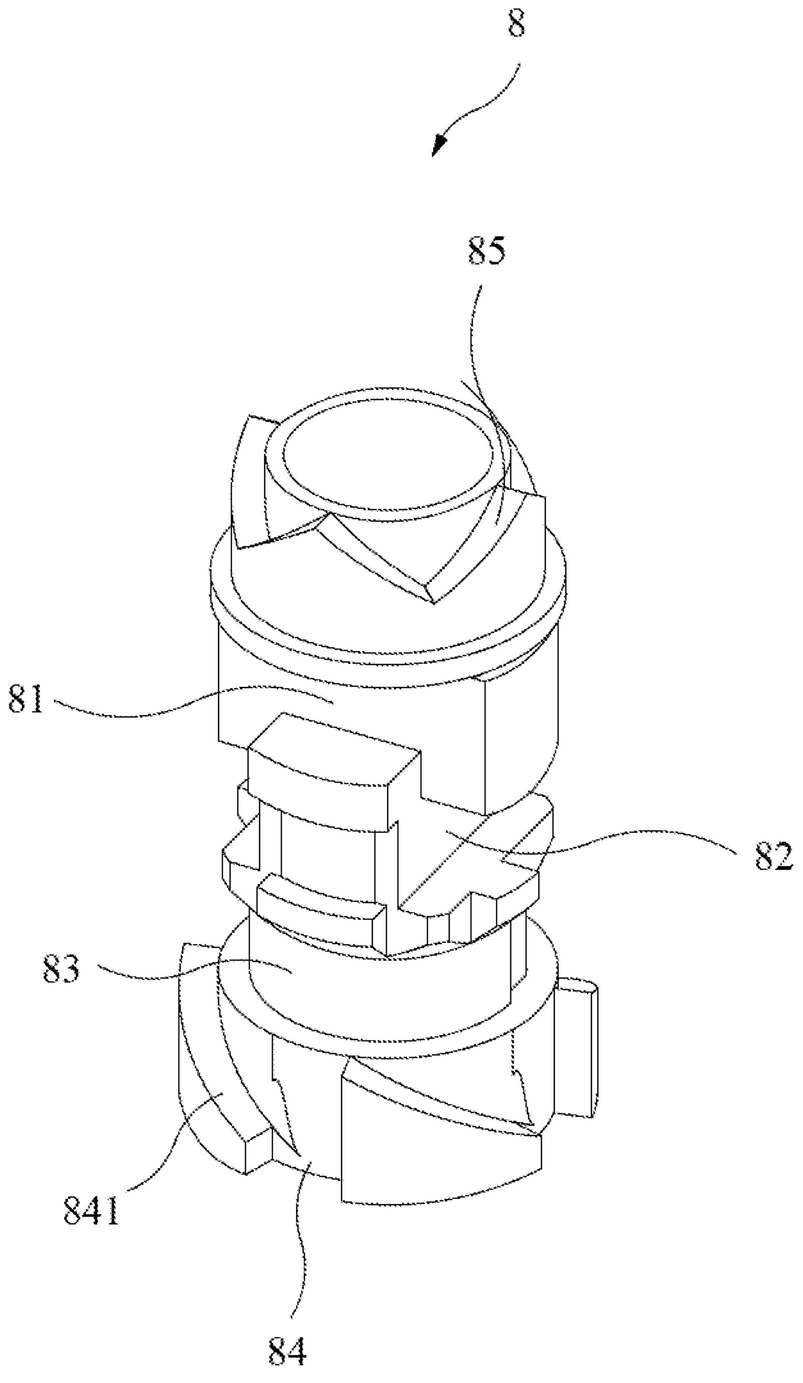
FIG. 5 shows a perspective view of a password key of an embodiment of the present invention.

As illustrated in the figures, 1 denotes the lock base; 11 denotes the sliding groove; 12 denotes the installing cavity; 13 denotes the password key slots; 131 denotes the guiding convex edges; 132 denotes the first rotating inclined surfaces; 2 denotes the push rod; 21 denotes the hooks; 3 denotes the locking pieces; 31 denotes the openings; 311 denotes the password key positioning grooves; 312 denotes the button positioning grooves; 4 denotes the rotating knob; 5 denotes the linkage assembly; 51 denotes the abutment piece cam; 511 denotes the first truncated surface; 512 denotes the unlocking convex cambered surfaces; 513 denotes the code-changing truncated surfaces; 52 denotes the abutment piece; 53 denotes the push rod cam; 531 denotes the second truncated surface; 532 denotes the resetting convex cambered surfaces; 54 denotes the limiting device; 55 denotes the limiting ring 55; 551 denotes the position-limiting projection; 6 denotes the position resetting assembly; 61 denotes the torsion spring; 62 denotes the push rod spring; 63 denotes the locking piece springs; 7 denotes the password key springs; 8 denotes the password keys; 81 denotes the upper positioning grooves; 82 denotes the lower positioning grooves; 83 denotes the annular position-limiting grooves; 84 denotes the guiding grooves; 841 denotes the second rotating inclined surfaces; 85 denotes the first V-shaped blocks; 9 denotes the button springs; 10 denotes the buttons; 101 denotes the second V-shaped blocks; 102 denotes the position-limiting convex edges; 20 denotes the lock core; 30 denotes the key; 40 denotes the base board; 50 denotes the outer shell; 60 denotes the resetting button.

DETAILED DESCRIPTION OF THE INVENTION

To further explain the technical solutions of the present invention, the following describes in detail the present invention with reference to the specific embodiments.

The present invention provides a code changing structure applied to a key coded lock, comprising a lock base 1, a push rod 2, two locking pieces 3, a rotating knob 4, a linkage assembly 5, a position resetting assembly 6, and sets of corresponding key springs 7, password keys 8, button springs 9 and buttons 10.

A top surface of the lock base 1 is provided with a sliding groove 11, an installing cavity 12 and a plurality of password key slots 13; the sliding groove 11 is connected to the mounting cavity 12 along a lengthwise direction of the lock base 1; the password key slots 13 are arranged symmetrically in pairs along two sides of the sliding groove 11; the push rod 2 is slidably fitted with the sliding groove 11; two sides of the push rod 2 are respectively provided with a plurality of hooks 21 corresponding to the password key slots 13; the two locking pieces 3 are respectively slidably arranged on the two sides of the sliding groove 11 and positioned outside the password key slots 13; an inner side of each locking piece 3 is provided with a plurality of openings 31 corresponding to the password key slots 13; the rotating knob 4 is rotatably fitted inside the installing cavity 12; the linkage assembly 5 is assembled on the rotating knob 4, and drives the push rod 2 and the locking pieces 3 to move axially along with rotation of the rotating knob 4; the position resetting assembly 6 is configured to drive the push rod 2, the locking pieces 3 and the rotating knob 4 to reset to an initial position; the key springs 7 and the password keys 8 are fitted inside corresponding password key slots 13; upper positioning grooves 81, lower positioning grooves 82 and an annular position-limiting groove 83 are provided successively from top to bottom on a peripheral surface of each password key 8; the upper positioning grooves 81 and the lower positioning grooves 82 are arranged in a staggered manner by orienting differently by an angle of difference on a circumferential plane of each password key 8; when each password key 8 is pressed, the annular position-limiting groove 83 of each password key 8 is hooked by a corresponding hook 21 to stop the password key 8 from bouncing up; when a correct password key 8 is pressed, the upper positioning grooves 81 thereof allow an axial movement of a corresponding locking piece 3; when an incorrect password key 8 is not pressed, the lower positioning grooves 82 thereof allow an axial movement of the locking piece 3; a corresponding button spring 9 and a corresponding button 10 are successively fitted on a top end of each password key 8; a press-rotating mechanism is provided between each button 10 and each corresponding password key slot 13 to drive a corresponding password key 8 to rotate; a code-changing height is preset during a pressing process of the buttons 10; when each button 10 is pressed to a position below the code-changing height, the press-rotating mechanism thereof is triggered to rotate a corresponding password key 8 so as to change password; after entering the correct password, the rotating knob 4 is rotatable; a first angle and a second angle of rotation are preset during a rotating process of the rotating knob 4; when the rotating knob 4 rotates to the first angle, the key coded lock is in an unlocked state, wherein the locking pieces 3 move away from the rotating knob 4 and prevent the buttons 10 from being pressed to the code-changing height when being pressed; when the rotating knob 4 rotates to the second angle, the locking pieces 3 move towards the rotating knob 4, so that the openings 31 allow movements of the buttons 10, and the buttons 10 are then able to be pressed to the code-changing height so as to change password.

The embodiments of the present invention are illustrated in FIGS. 1-5.

Each press-rotating mechanism comprises guiding convex edges 131 provided on a side wall of the corresponding password key slot 13, guiding grooves 84 provided on a bottom end of the corresponding password key 8 matching with the guiding convex edges 131, a plurality of first V-shaped blocks 85 provided on a top portion of the corresponding password key 8, and a plurality of second V-shaped blocks 101 provided inside the corresponding button 10; a junction part of every two adjacent first V-shaped blocks 85 aligns with a corresponding guiding groove 84; the first V-shaped blocks 85 and the second V-shaped blocks 101 are arranged in a staggered manner around an axis of the corresponding password key 8; a first rotating inclined surface 132 and a second rotating inclined surface 841 are provided on a bottom end of each guiding convex edge 131 and a side surface of each guiding groove 84 respectively; when a button 10 is pressed, the button 10 drives the guiding grooves 84 of a corresponding password key 8 to be slidably fitted with the corresponding guiding convex edges 131 so that the button 10 moves downward, until the first rotating inclined surfaces 132 and the second rotating inclined surfaces 841 are at a same level; action force produced by staggered arrangement of the second V-shaped blocks 101 and the first V-shaped blocks 85 rotates the corresponding password key 8 such that the first rotating inclined surfaces 132 engage with the corresponding second rotating inclined surfaces 841; when the password key 8 resets, the second rotating inclined surfaces 841 move along the first rotating inclined surfaces 132 to drive the password key 8 to rotate, so as to change password. In the present embodiment, the upper positioning grooves 81 and the lower positioning grooves 82 of each password key 8 are oriented by a ninety-degree difference with respect to each other on a circumferential plane of the password key 8, and thus each password key 8 rotates by ninety degrees each time when the press-rotating mechanism is pressed.

When the second rotating inclined surfaces 841 of the guiding grooves 84 drive the password key 8 to rotate by ninety degrees, password can be changed, thus providing a simple and convenient operation.

The linkage assembly 5 comprises a abutment piece cam 51 fitted with the rotating knob 4, and an abutment piece 52 around the cam 51; an end of each locking piece 3 abuts the abutment piece 52; a periphery of the abutment piece cam 51 is provided with a first truncated surface 511, a pair of unlocking convex cambered surfaces 512 and a pair of code-changing truncated surfaces 513 successively arranged; during a process when the rotating knob 4 is rotated to the first angle, either one of the unlocking convex cambered surfaces 512 push the abutment piece 52 to drive the locking pieces 3 to move away from the rotating knob 4; during a process when the rotating knob 4 is rotated to the second angle, either one of the code-changing truncated surfaces 513 gives way to the abutment piece 52 and thus enabling the locking pieces 3 to move towards the rotating knob 4. In the present embodiment, two sides of the first truncated surface 511 are symmetrically provided with said pair of unlocking convex cambered surfaces 512 respectively and said pair of code-changing truncated surface 513 respectively, so that the rotating knob 4 can perform unlocking and code-changing no matter if it is rotated in clockwise or anti-clockwise direction, thereby not limiting the operating direction; the first angle is set as ninety degrees, and the second angle is set as one hundred thirty-five degrees; namely, the rotating knob 4 rotates by ninety degrees to perform unlocking, and further rotates forty-five degrees to perform code-changing, which is convenient for users to memorize and operate.

The linkage assembly 5 further comprises a push rod cam 53 fitted with the rotating knob 4; the push rod 2 abuts a periphery of the push rod cam 53; the periphery of the push rod cam 53 is successively provided with a second truncated surface 531 and a pair of resetting convex cambered surfaces 532; during a process when the rotating knob 4 is rotating to the first angle, either one of the resetting convex cambered surfaces 532 pushes the push rod 2 to move away from the rotating knob 4, so that each hook 21 is separated from a corresponding annular position-limiting groove 83, so as to reset password. In the present embodiment, two sides of the second truncated surface 531 are symmetrically provided with said pair of convex cambered resetting surface 532 respectively, so that the rotating knob 4 can perform password resetting no matter if it is rotated clockwise or anticlockwise, thereby not limiting the operating direction.

The linkage assembly 5 further comprises a limiting device 54 slidably fitted with the lock base 1, and a limiting ring 55 fitted with the rotating knob 4; the limiting device 54 abuts a periphery of the limiting ring 55; two position-limiting projections 551 and 551' are provided on the periphery of the limiting ring 55; positions of the two position-limiting projections 551 and 551' are arranged corresponding to the first angle and the second angle of the rotating knob 4 respectively; when the limiting device 54 is in a closed state, the limiting device 54 and the position-limiting projection 551 coordinately limit the rotating motion of the limiting ring 55 within the first angle; in other words, only when the limiting device 54 is in an opened state, the rotating knob 4 is able to rotate to the second angle so as to change password; when the limiting device 54 is in an opened state, the limiting device 54 and the position-limiting projection 551' coordinately limit the rotating motion of the limiting ring 55 within the second angle, so as to prevent users from being unable to change password due to excessive rotation. Both the limiting device 54 and the limiting ring 55 perform limiting functions, which prevent users from accidentally changing the password due to excessive rotation and thus making the lock unusable; meanwhile, by arranging the rotating knob 4 with a certain size, the limiting device 54 is covered by the rotating knob 4 until the rotating knob 4 rotates to the first angle, and therefore the password of the present invention can only be changed after being unlocked by entering the correct password.

The position resetting assembly 6 comprises a torsion spring 61 provided between the installing cavity 12 and the rotating knob 4, a push rod spring 62 provided between an end of the sliding groove 11 and the push rod 2, and two locking piece springs 63 respectively provided between the lock base 1 and each locking piece 3.

Each opening 31 comprise a password key positioning groove 311 and a button positioning groove 312 adjacent to each other; a periphery of a bottom end of each button 10 is provided with position-limiting convex edges 102; when the locking pieces 3 are in an initial position, the password key positioning grooves 311 enable the buttons 10 to drive the password keys 8 to be pressed, while the locking pieces 3 block the position-limiting convex edges 102 of the buttons 10 to limit the buttons 10 from being pressed to the code-changing height; when the locking pieces 3 move towards the rotating knob 4, the button positioning grooves 312 enable the buttons 10 to drive the password keys 8 to be pressed to the code-changing height.

In actual use, the rotating knob 4 is connected to a latch of the key coded lock; when the rotating knob 4 is in a rotatable state (i.e. when the correct password is entered), the rotating knob 4 can be rotated by a user to drive the latch so as to unlock the key coded lock. Furthermore, the present invention comprises a lock core 20 installed inside the rotating knob 4, and a key 30 matching with the lock core 20; when a matched key 30 is inserted into the lock core 20 and rotated, the key coded lock can be unlocked by directly rotating the latch.

The present invention further comprises a base board 40 covering the top surface of the lock base 1 and an outer shell 50 housing the lock base 1 for fixing and installing components of the key coded lock.

Furthermore, similar as conventional key coded locks, the password key 8 located at a last position can be embodied as a resetting button 60 (i.e. a clear button) with the hook 21 on the push rod 2 corresponding to the resetting button 60 being removed; when the resetting button 60 is pressed, the resetting button 60 drives the push rod 2 to move away from the rotating knob 4, so that the hooks 21 are separated from the annular position-limiting grooves 83 of the other password keys 8. Accordingly, the password keys 8 which are pressed can be reset.

Figure 6:
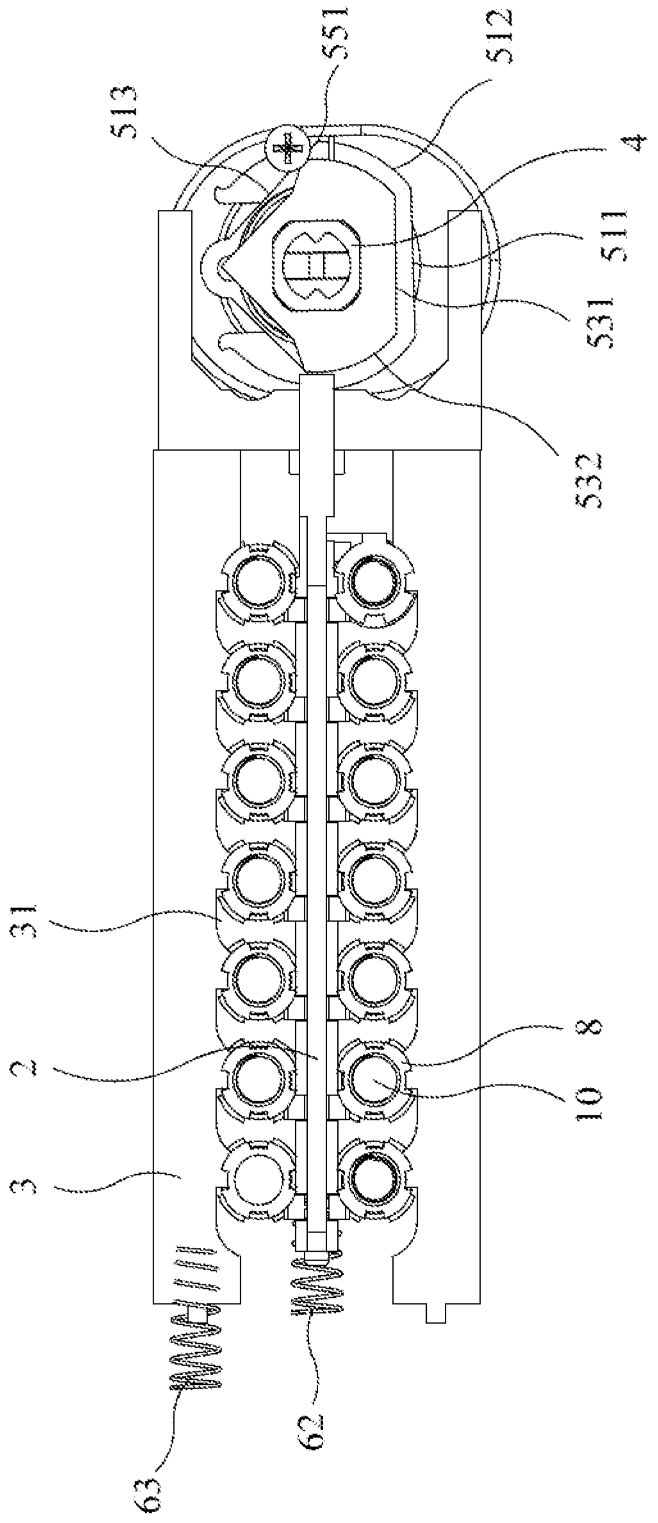
FIG. 6 shows a schematic view of an embodiment of the present invention in an unlocked state.
Figure 7:
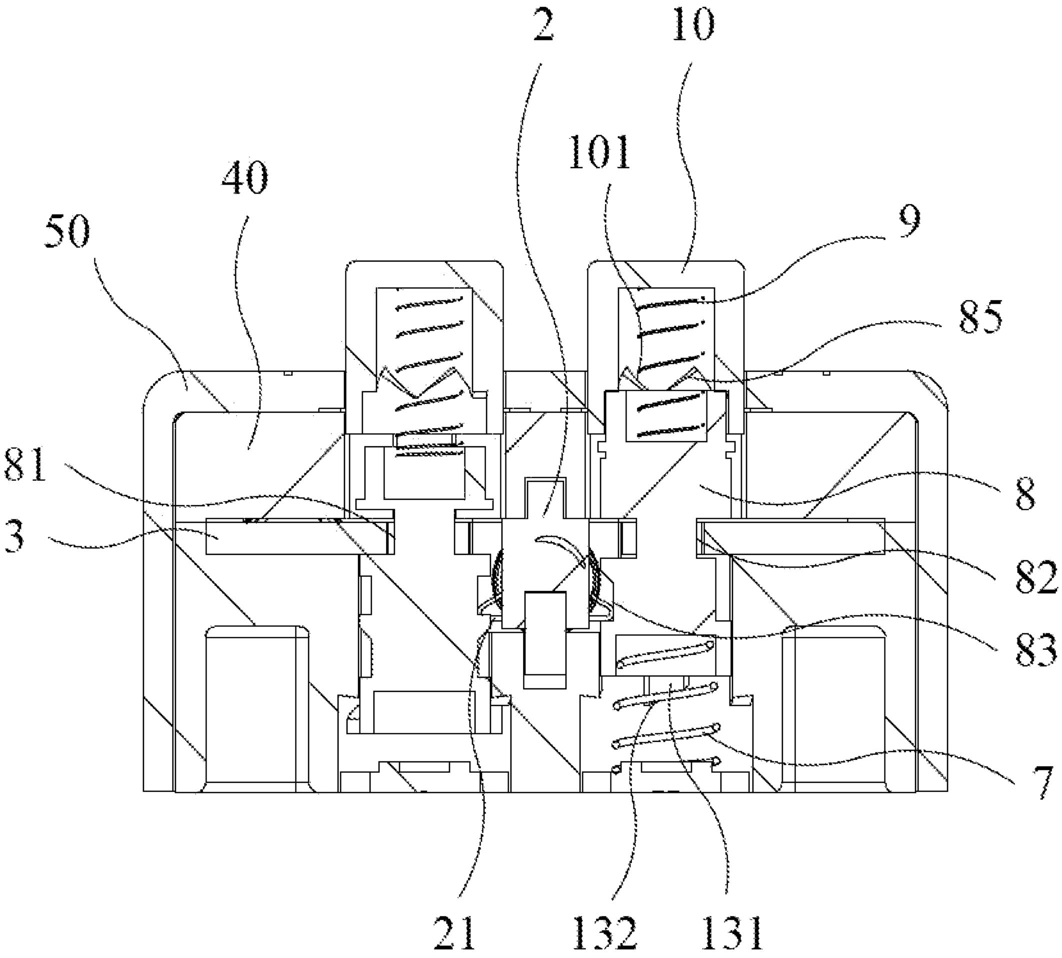
FIG. 7 shows a sectional view of an embodiment of the present invention in an unlocked state.

FIGS. 6-7 show the unlocking operation of the present invention. The operating mechanism of the present invention is as follows: before the buttons 10 are pressed, the locking pieces 3 are able to pass through the lower positioning grooves 82 of the password keys 8 of an incorrect password, and, are blocked by the password keys 8 of a correct password; after the buttons 10 are pressed, the locking pieces 3 are able to pass through the upper positioning grooves 81 of the password keys 8 of a correct password, and are blocked by the password keys 8 of an incorrect password; only when all the password keys 8 of a correct password are pressed, both the upper positioning grooves 81 of the password keys 8 of a correct password and the lower positioning grooves 82 of the password keys 8 of an incorrect password are in alignment, thus allowing the locking pieces 3 to pass through; at this time, the rotating knob 4 is free from position limiting, and can be rotated to unlock the key coded lock.

Figure 8:
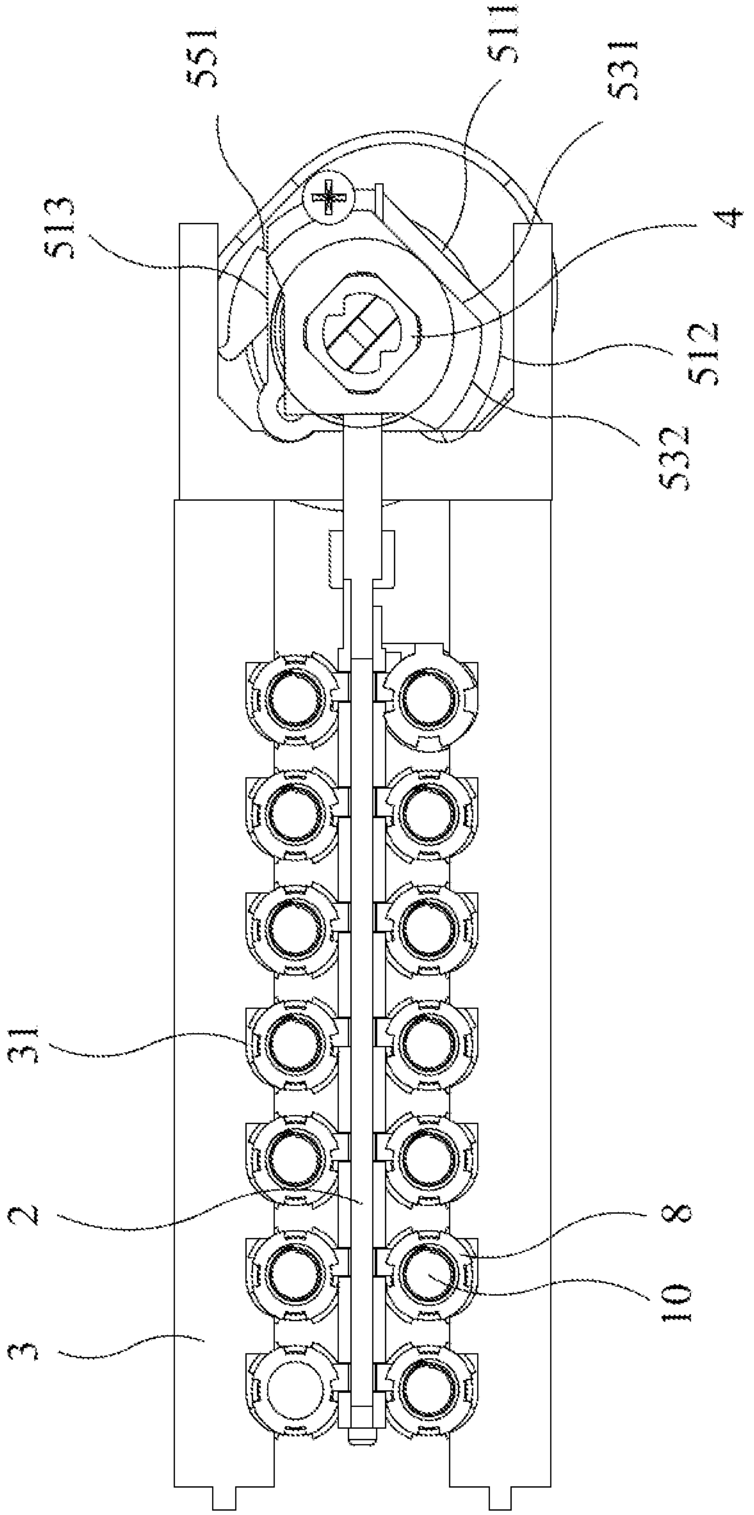
FIG. 8 shows a schematic view of an embodiment of the present invention in a code-changing state.
Figure 9:
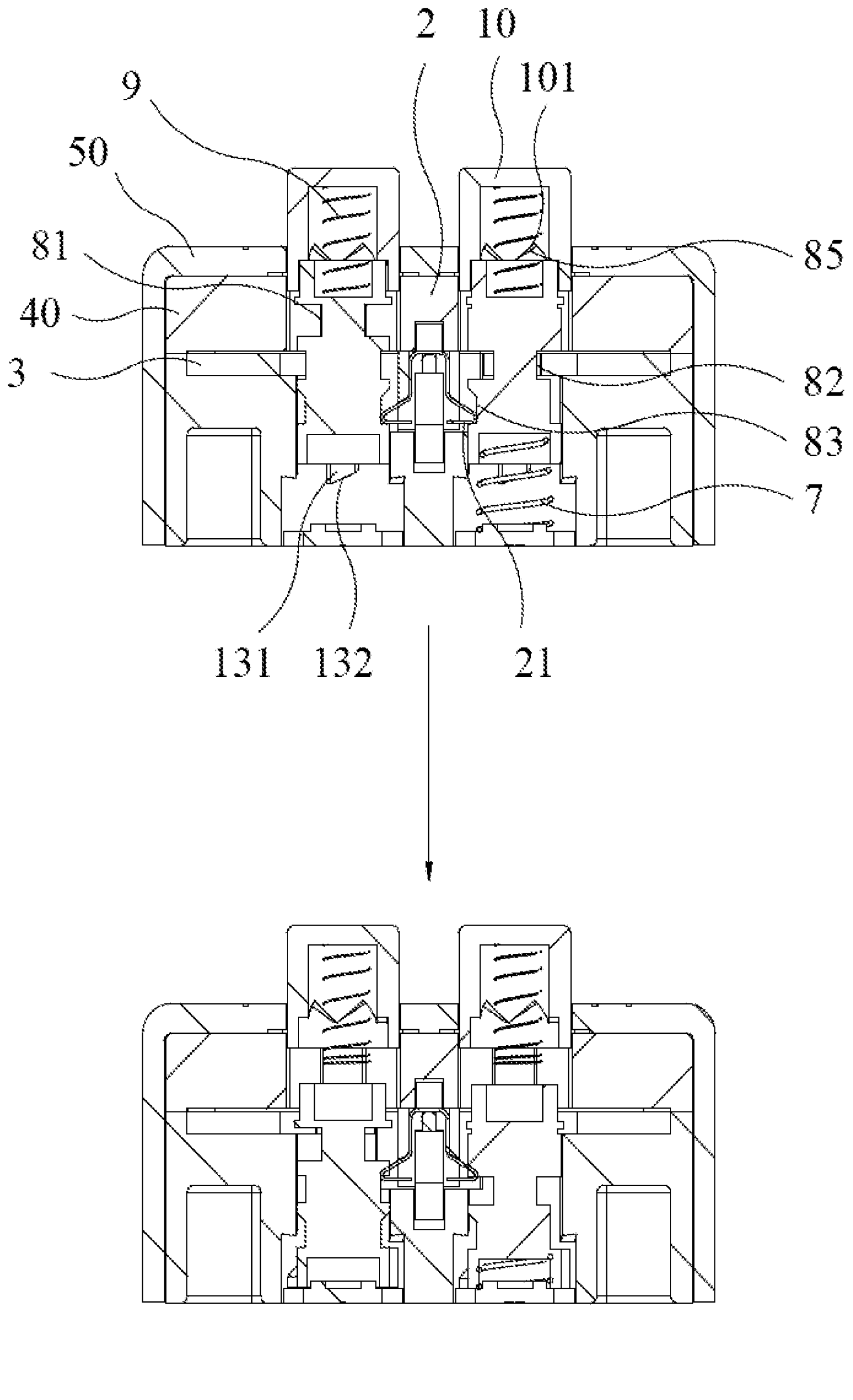
FIG. 9 shows a sectional view of an embodiment of the present invention in a code-changing state.

FIGS. 8-9 show the code-changing operation of the present invention as follows: after entering the correct password, rotate the rotating knob 4 by ninety degrees; trigger the limiting device 54 to release the key coded lock from a code-changing limiting state, and then rotate the rotating knob 4 again by forty-five degrees, and maintain the rotating knob 4 in such rotated state; enter the old password again (so that all the password keys 8 no longer indicate the old password and the old password is thus nullified), and then enter a new password; release the rotating knob 4, and the torsion spring 61 drives the rotating knob 4 to reset, thereby setting the new password. The process of code-changing herein is as follows: when the buttons 10 of the new password are pressed, each button 10 drives the guiding grooves 84 of the corresponding password key 8 to move downward and be slidably fitted with the corresponding guiding convex edges 131, until the first rotating inclined surfaces 132 and the second rotating inclined surfaces 841 are at the same level; action force produced by staggered arrangement of the second V-shaped blocks 101 and the first V-shaped blocks 85 rotates the corresponding password key 8 such that the first rotating inclined surfaces 132 engage with the corresponding second rotating inclined surfaces 841; when the password key 8 resets, the second rotating inclined surfaces 841 move along the first rotating inclined surfaces 132 to drive the password key 8 to rotate, so as to change password.

Through the aforementioned solutions, pressing heights of the buttons 10 and the password keys 8 are limited by different rotating angles of the rotating knob 4; when a correct password is entered and the rotating knob 4 is rotated to the second angle, the buttons 10 can be pressed to drive the password keys 8 to lower to the code-changing height, so as to change password by triggering the press-rotating mechanism; code-changing operation of the present invention only requires entering a correct password without the needs to disassemble the lock, which is simple, time-saving and effort-saving to operate, thus providing good user's experience.

The embodiments and the accompanying drawings above are not intended to set a limit to the present invention; equivalent changes and modifications made by those skilled in the art without departing from the essence and scope of the present invention, shall also fall within the protection scope of the present invention.

What is claimed is:

1. A code changing structure, applied to a key coded lock;

wherein the code changing structure comprises a lock base, a push rod, two locking pieces, a rotating knob, a linkage assembly, a position resetting assembly, and sets of corresponding key springs, password keys, button springs and buttons;

a top surface of the lock base is provided with a sliding groove, an installing cavity and a plurality of password key slots; the sliding groove is connected to the installing cavity along a lengthwise direction of the lock base; the password key slots are arranged symmetrically in pairs along two sides of the sliding groove;

the push rod is slidably fitted with the sliding groove; two sides of the push rod are respectively provided with a plurality of hooks corresponding to the password key slots;

the two locking pieces are respectively slidably arranged on the two sides of the sliding groove and positioned outside the password key slots; an inner side of each locking piece is provided with a plurality of openings corresponding to the password key slots;

the rotating knob is rotatably fitted inside the installing cavity;

the linkage assembly is assembled on the rotating knob, and drives the push rod and the locking pieces to move axially along with rotation of the rotating knob;

the position resetting assembly is configured to drive the push rod, the locking pieces and the rotating knob to reset to an initial position;

the key springs and the password keys are each fitted inside a corresponding one of the password key slots; upper positioning grooves, lower positioning grooves, and an annular position-limiting groove are provided successively from a top to a bottom on a peripheral surface of each password key; the upper positioning grooves and the lower positioning grooves are arranged in a staggered manner by orienting differently by an angle of difference on a circumferential plane of each password key; when each password key is pressed, the annular position-limiting groove of each password key is hooked by a corresponding one of the hooks of the push rod to stop the password key from bouncing up; when a correct password key of the password keys is pressed, the upper positioning grooves of each correct password key allow an axial movement of a corresponding locking piece of the locking pieces; when an incorrect password key of the password keys is not pressed, the lower positioning grooves thereof of each incorrect password key allow an axial movement of the locking piece; a corresponding button spring and a corresponding button are successively fitted on a top end of each password key; a press-rotating mechanism is provided between each button and each corresponding one of the password key slots to drive a corresponding one of the password keys to rotate; a code-changing height of each button is preset; when each button is pressed to a position below the code-changing height, the press-rotating mechanism thereof is triggered to rotate the corresponding one of the password keys so as to change a password of the key coded lock;

after entering a correct password using correct password keys, the rotating knob is rotatable; a first angle and a second angle of rotation of the rotating knob are preset; when the rotating knob rotates to the first angle, the key coded lock is in an unlocked state, in which the locking pieces move away from the rotating knob and prevent the buttons from being pressed to the code-changing height when being pressed; when the rotating knob rotates to the second angle, the locking pieces move towards the rotating knob, so that the openings allow movements of the buttons, and the buttons are then able to be pressed to the code-changing height so as to change the password.

2. The code changing structure of claim 1, wherein each press-rotating mechanism comprises guiding convex edges provided on a side wall of the corresponding one of the password key slots, guiding grooves provided on a bottom end of the corresponding one of the password keys match with the guiding convex edges, a plurality of first V-shaped blocks are provided on a top portion of the corresponding one of the password keys, and a plurality of second V-shaped blocks are provided inside a corresponding one of the buttons; a junction part of every two adjacent first V-shaped blocks aligns with a corresponding one of the guiding grooves; the first V-shaped blocks and the second V-shaped blocks are arranged in a staggered manner around an axis of the corresponding one of the password keys; a first rotating inclined surface and a second rotating inclined surface are provided on a bottom end of each guiding convex edge and a side surface of each guiding groove respectively; when one of the buttons is pressed, the one button drives the guiding grooves of a corresponding one of the password keys to be slidably fitted with the corresponding ones of the guiding convex edges so that the one button moves downward, until the corresponding first rotating inclined surfaces and the corresponding second rotating inclined surfaces are at a same level; action force produced by staggered arrangement of the second V-shaped blocks and the first V-shaped blocks rotates the corresponding one of the password keys such that the first rotating inclined surfaces engage with the corresponding second rotating inclined surfaces; when the corresponding one of the password keys resets after being pressed, the corresponding second rotating inclined surfaces move along the corresponding first rotating inclined surfaces to drive the corresponding one of the password keys to rotate, so as to change the password.

3. The code changing structure of claim 2, wherein the second rotating inclined surfaces of the guiding grooves drives the corresponding one of the password keys to rotate by ninety degrees so that the password can be changed.

4. The code changing structure of claim 2, wherein the upper positioning grooves and the lower positioning grooves of each password key are oriented by a ninety-degree difference with respect to each other on the circumferential plane of the password key.

5. The code changing structure of claim 1, wherein the linkage assembly comprises an abutment piece cam fitted with the rotating knob, and an abutment piece around the abutment piece cam; an end of each locking piece abuts the abutment piece; a periphery of the abutment piece cam is provided with a first truncated surface, a pair of unlocking convex cambered surfaces and a pair of code-changing truncated surfaces successively arranged; during a process when the rotating knob is rotated to the first angle, either one of the unlocking convex cambered surfaces pushes the abutment piece to drive the locking pieces to move away from the rotating knob; during a process when the rotating knob is rotated to the second angle, either one of the code-changing truncated surfaces gives way to the abutment piece and thus enabling the locking pieces to move towards the rotating knob.

6. The code changing structure of claim 5, wherein two sides of the first truncated surface are symmetrically provided with said pair of unlocking convex cambered surfaces respectively and said pair of code-changing truncated surface respectively.

7. The code changing structure of claim 5, wherein the first angle is set as ninety degrees, and the second angle is set as one hundred thirty-five degrees.

8. The code changing structure of claim 5, wherein the linkage assembly further comprises a push rod cam fitted with the rotating knob; the push rod abuts a periphery of the push rod cam; the periphery of the push rod cam is successively provided with a second truncated surface and a pair of resetting convex cambered surfaces; during a process when the rotating knob is rotated to the first angle, either one of the resetting convex cambered surfaces pushes the push rod to move away from the rotating knob, so that each hook is separated from a corresponding one of the annular position-limiting grooves so as to reset the password.

9. The code changing structure of claim 8, wherein two sides of the second truncated surface are symmetrically provided with said pair of convex cambered resetting surface, respectively.

10. The code changing structure of claim 5, wherein the linkage assembly further comprises a limiting device slidably fitted with the lock base, and a limiting ring fitted with the rotating knob; the limiting device abuts a periphery of the limiting ring; two position-limiting projections are provided on the periphery of the limiting ring; positions of the two position-limiting projections are arranged corresponding to the first angle and the second angle of the rotating knob, respectively;

when the limiting device is in a closed state, the limiting device and one of the position-limiting projections coordinately limit the rotating motion of the limiting ring within the first angle;

when the limiting device is in an opened state, the limiting device and the other one of the position-limiting projections coordinately limit the rotating motion of the limiting ring within the second angle.

11. The code changing structure of claim 1, wherein the position resetting assembly comprises a torsion spring provided between the installing cavity and the rotating knob, a push rod spring provided between an end of the sliding groove and the push rod, and two locking piece springs respectively provided between the lock base and each locking piece.

12. The code changing structure of claim 1, wherein each opening comprises a password key positioning groove and a button positioning groove adjacent to each other; a periphery of a bottom end of each button is provided with position-limiting convex edges;

when the locking pieces are in an initial position, the password key positioning grooves enable the buttons to allow the password keys to be pressed, while the locking pieces block the position-limiting convex edges of the buttons to limit the buttons from being pressed to the code-changing height;

when the locking pieces move towards the rotating knob, the button positioning grooves enable the buttons to allow the password keys to be pressed to the code-changing height.

* * * * *